C. S. GILHOUSEN.
SPECULUM.
APPLICATION FILED SEPT. 18, 1914.

1,239,000.

Patented Sept. 4, 1917.

Witnesses
C. R. Hardy
C. V. P. Newlved

Inventor
Chase S. Gilhousen
By Richard B. Owen
Attorney

UNITED STATES PATENT OFFICE.

CHASE S. GILHOUSEN, OF MARBLETON, WYOMING.

SPECULUM.

1,239,000. Specification of Letters Patent. Patented Sept. 4, 1917.

Application filed September 18, 1914. Serial No. 862,373.

*To all whom it may concern:*

Be it known that I, CHASE S. GILHOUSEN, a citizen of the United States, residing at Marbleton, in the county of Lincoln and State of Wyoming, have invented certain new and useful Improvements in Specula, of which the following is a specification.

This invention relates to veterinary instruments, and more particularly relates to specula or devices capable of maintaining an animal's mouth in an open position to facilitate inspection.

As the principal object, this invention contemplates the provision of a speculum which shall be so constructed that the animal's mouth will be reliably and adjustably maintained in an open position.

A coördinate object is to provide an instrument of this character in which the adjusting parts are so situated as not to obstruct the use of tools upon or in the animal's mouth.

An object of equal importance with the foregoing, is to so construct a speculum of this character with regard to proportion, number and arrangement of parts as to provide a device that will be cheaply manufactured, while at the same time durable and efficient in operation.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which like characters of reference designate similar parts:

Figure 1:
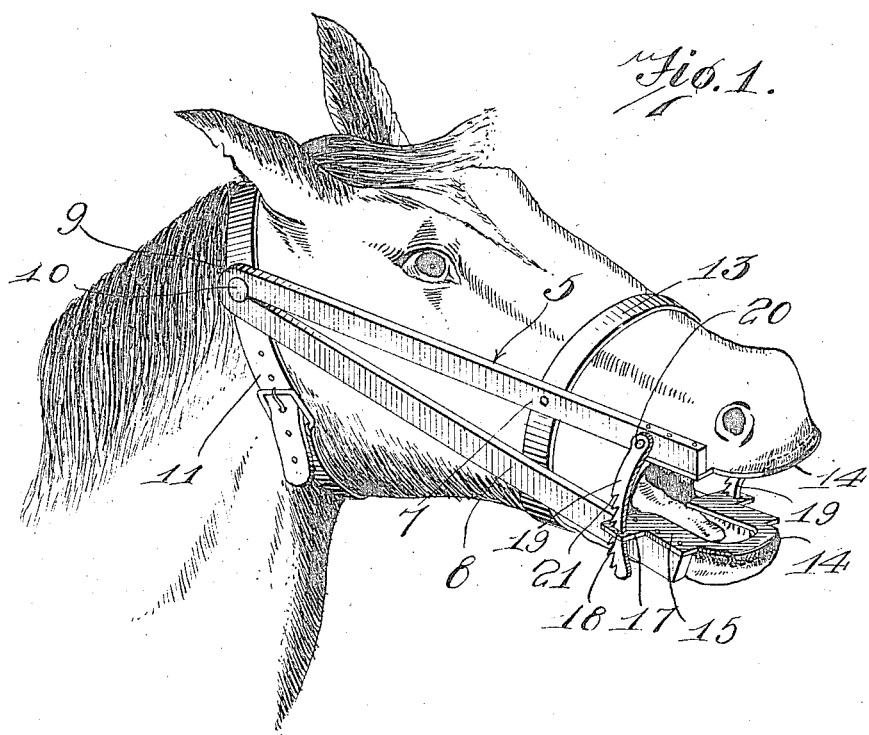
Figure 1 is a perspective view of the invention as it is positioned upon the head of a horse.
Figure 2:
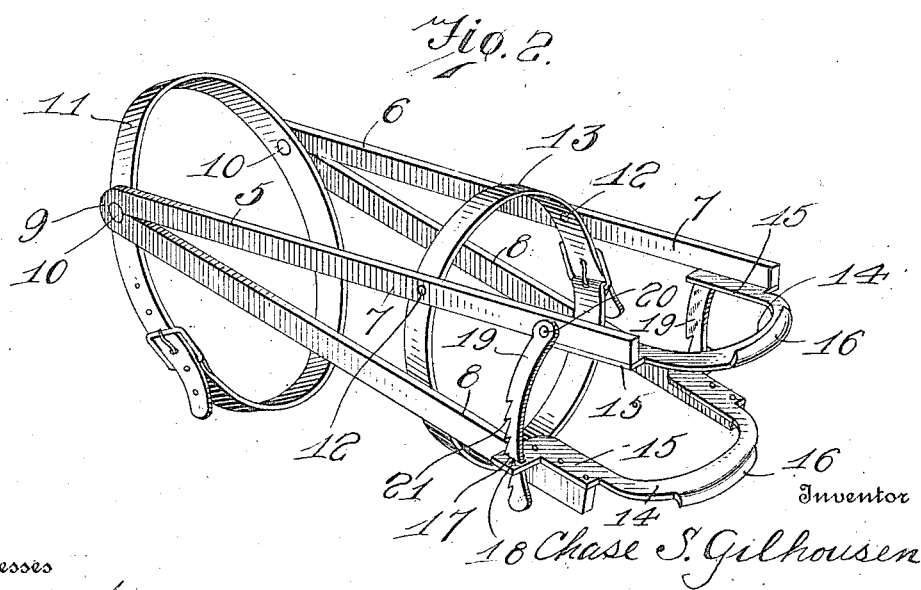
Fig. 2 is a perspective view illustrating the device in detail removed from the animal.

In the embodiment illustrated, the main portion may be said to consist of the pairs of side bars 5 and 6, which are preferably formed of a strong, yet springy metal with the respective bars 7 and 8 of each pair converging rearwardly to a point of intersection 9 at which they are hinged as shown at 10 and pivotally secured to a head strap 11. The bars 7 and 8 of each pair are thus alined in the same vertical plane in the manner similar to a pair of compasses and the upper bars 7 of each pair may be secured as shown at 12 to the nose strap 13.

The upper bars of each pair and similarly the lower bars of each are connected by a U-shaped plate 14 having the enlarged flanged ends 15 by which it is secured to the bars and being provided at the center of the curved portion with the vertical extensions 16 so formed as to abut the animal's teeth upon the outer side thereof when said teeth are resting properly upon the plate 14. The lower U-shaped member 14 is provided with an angular lateral extension 17 which is suitably slotted as at 18 to receive an arcuate notch bar 19, said bar being pivoted at a point 20 removed the same distance from the ends of the bars 7 as the animal's mouth. This bar 19 is suitably notched as at 21 to act as an adjustable detent in conjunction with the slot 18 as will be obvious upon a perusal of the drawings.

In practice, after the strap 11 has been buckled about the animal's head in the manner illustrated and the nose strap 13 has also been secured thereon the pairs of bars 5 and 6 will extend longitudinally of the head of the animal and enable the use of the plates 14 in a manner somewhat similar to the use of an ordinary bit with the extensions 16 abutting the outer surface of the animal's teeth as the latter rest upon the plates 14. It will then be obvious that the speculum may be adjusted by means of the notched bar 19 and it will further be apparent that this notched bar will reliably maintain the device in its adjusted position in such manner that no obstruction will be offered to the use of tools upon the animal's mouth or to the use of a means for illuminating the interior thereof, thus attaining the objects previously set forth.

While in the foregoing however, I have thus illustrated in the drawings and described in the specification such combination and arrangement of elements as constitute the preferred embodiment of my invention, I desire to emphasize the fact that I may make such minor changes in the matters of proportion and degree, in later adaptations of my device as shall not alter the spirit of my invention as defined in the appended claims.

What I claim is:

1. In a speculum, pairs of converging side bars, each pair pivoted together at one end and adapted to be placed on opposite sides of an animal's head, a head strap to which the pivot means of said side bars are secured, U-shaped plates adapted to connect the free ends of corresponding bars of said pairs of bars, said connecting plates being widened at their ends to overlap the ends of the bars for connection thereto, lateral extensions on one of said plates at the ends thereof each having an opening therein, and a curved catch having a toothed edge hinged freely on the side bar of each pair opposite the lateral extensions and adapted to move through the openings therein and co-acting with the edges thereof for maintaining the speculum in an open set position.

2. In a speculum, side bars converging the entire length of an animal's head, a head strap, means pivotally connecting pairs of the side bars and securing them to opposite sides of the strap, a nose strap forming an intermediate connection between corresponding bars of opposite pairs, plates carried at the extremities of similar bars of opposite pairs, a slotted extension projecting laterally from each side of one of said plates, and means pivoted to a bar of each pair to coact with a corresponding lateral extension to maintain the speculum in open set position.

In testimony whereof I affix my signature in presence of two witnesses.

CHASE S. GILHOUSEN.

Witnesses:
K. J. LUMAN,
J. F. SHIPLEY.

Copies of this patent may be obtained for five cents each, by addressing the "Commissioner of Patents, Washington, D. C."